United States Patent
Hsu

(10) Patent No.: US 7,278,738 B2
(45) Date of Patent: Oct. 9, 2007

(54) EYEGLASS LENS WITH NON-UNIFORM COATINGS

(75) Inventor: Wen-Yi Hsu, El Centro, CA (US)

(73) Assignee: Eye Ojo Corp., Ontario, CA (US)

( * ) Notice: Subject to any disclaimer, the term of this patent is extended or adjusted under 35 U.S.C. 154(b) by 253 days.

(21) Appl. No.: 10/153,392

(22) Filed: May 21, 2002

(65) Prior Publication Data

US 2004/0201822 A1    Oct. 14, 2004

(51) Int. Cl.
   *G02C 7/10* (2006.01)
(52) U.S. Cl. ........................ 351/163; 359/738; 351/177
(58) Field of Classification Search ............... 359/738; 351/44, 45, 159, 163, 165, 177; D26/2
   See application file for complete search history.

(56) References Cited

U.S. PATENT DOCUMENTS

| | | | | |
|---|---|---|---|---|
| 1,637,406 A * | 8/1927 | Brumder | ..................... | 473/210 |
| 4,070,097 A * | 1/1978 | Gelber | ....................... | 359/581 |
| 4,161,547 A * | 7/1979 | Kienel | ......................... | 428/213 |
| 4,338,003 A * | 7/1982 | Adrian | ......................... | 351/45 |
| 4,802,755 A * | 2/1989 | Hensler | ...................... | 351/163 |
| 5,892,600 A * | 4/1999 | Kuo | ............................ | 359/15 |
| 5,926,248 A * | 7/1999 | Tucker | ......................... | 351/44 |
| 6,361,166 B1 * | 3/2002 | Perrott et al. | ............... | 351/159 |
| D497,014 S * | 10/2004 | Lee | ............... | D26/2 |
| 2002/0049374 A1 * | 4/2002 | Abreu | ......................... | 600/405 |
| 2004/0070726 A1 * | 4/2004 | Ishak | ......................... | 351/163 |

* cited by examiner

*Primary Examiner*—Scott J. Sugarman
*Assistant Examiner*—Darryl J. Collins
(74) *Attorney, Agent, or Firm*—Wang, Hartmann & Gibbs, PC; Larry E. Severin; Franklin E. Gibbs

(57) ABSTRACT

An eyeglass lens has a front side, a back side, a central portion and a peripheral portion. The lens is coated on one or both of it sides with a reflective coating, an anti-reflective coating or both. The reflective coating and/or the anti-reflective coating in the central portion of the lens is different from the reflective coating and/or anti-reflective coating in the peripheral portion of the lens. In one embodiment, the peripheral portion of the front side of the lens is coated with a reflective coating and the central portion of the back side of the lens is coated with an anti-reflective coating.

22 Claims, 3 Drawing Sheets

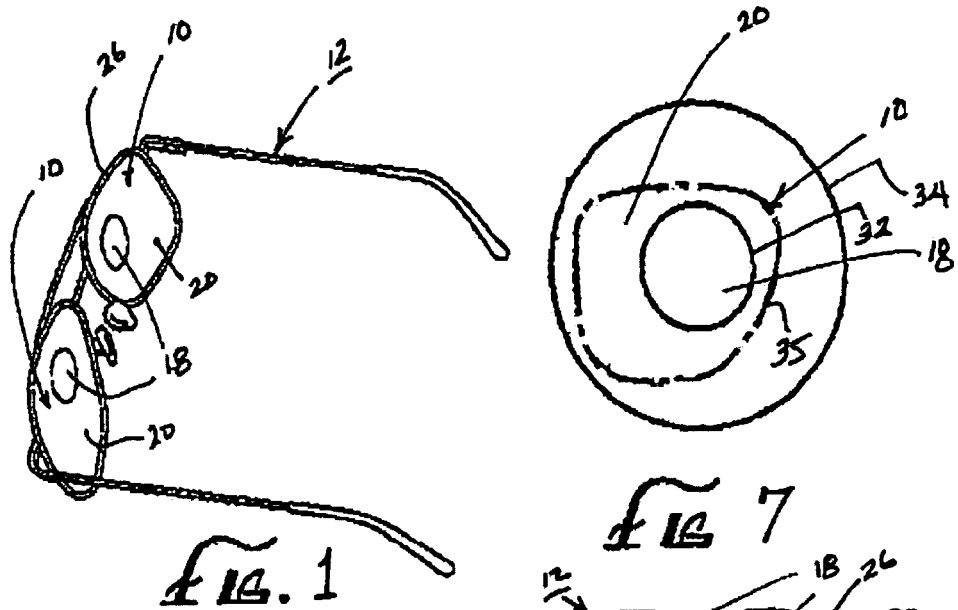
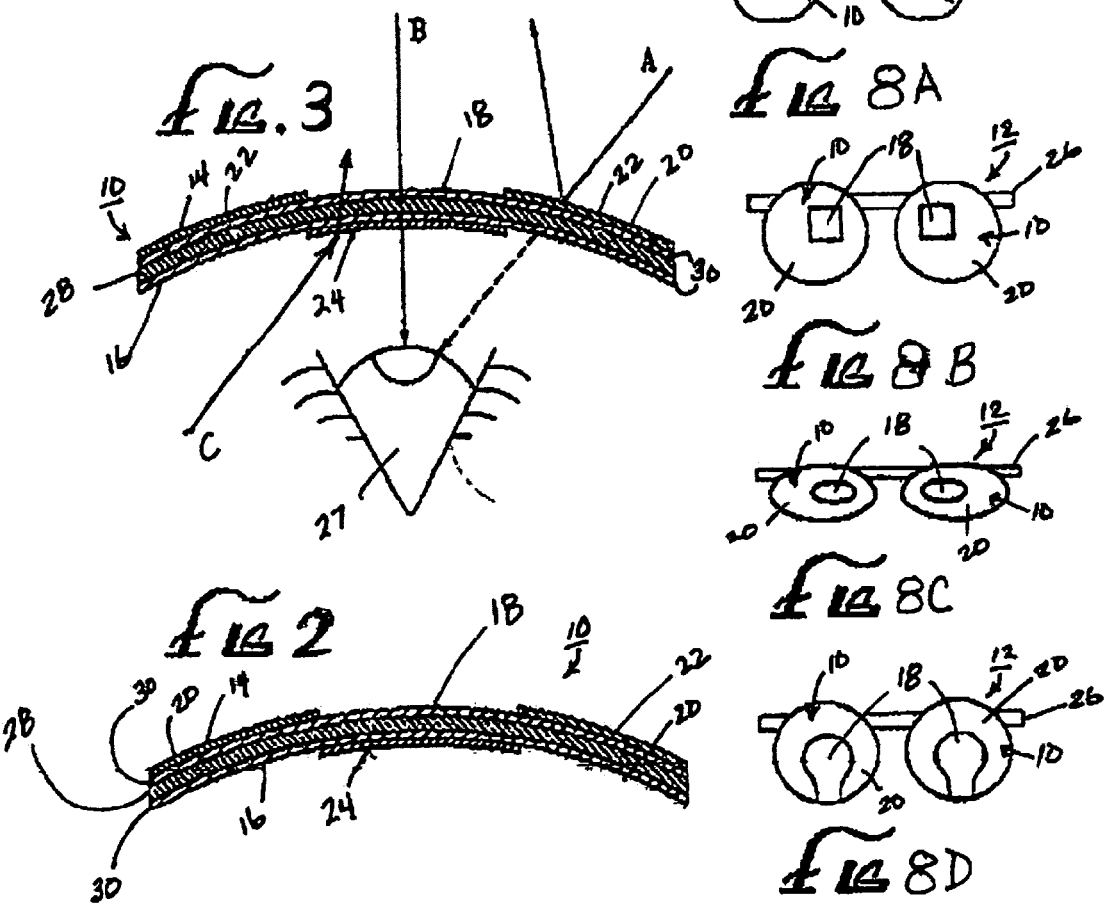

EYEGLASS LENS WITH NON-UNIFORM COATINGS

FIELD OF THE INVENTION

This invention relates generally to eyeglasses and, more particularly, to eyeglass lenses having one or more reflective or anti-reflective coatings.

BACKGROUND OF THE INVENTION

Eye fatigue can frequently arise from extraneous light rays impacting the eye from light sources other than that which the eye is focused on. Even when the eye is in an environment having but a single source of light, extraneous light rays are reflected from smooth flat surfaces in the vicinity of the eye such that extraneous light rays impact the eye from a myriad of directions.

In an attempt to minimize eye fatigue from such extraneous light rays, manufacturers of eyeglasses have experimented with the coating of eyeglass lenses with reflective coatings which tend to reflect light and/or with anti-reflective coatings which tend to minimize reflection. In prior art lenses of this type, reflective coatings are traditionally applied to the front side of the lens and anti-reflective coatings are applied to the back side of the lens. In all such cases in the prior art, the lens coatings are uniform across the entirety of the lens.

It has been found that the use of such prior art coated lenses is not wholly satisfactory in reducing eye fatigue. Accordingly, there is a need for an improved lens having additional capabilities in reducing eye fatigue.

SUMMARY

The invention satisfies this need. The invention is an eyeglass lens comprising a front side, a back side, a central portion and a peripheral portion. The lens is coated on one or both of its sides with a reflective coating, an anti-reflective coating and/or both. The reflective coating and/or the anti-reflective coating in the central portion of the lens is different from the reflective coating and/or anti-reflective coating in the peripheral portion of the lens.

DRAWINGS

These features, aspects and advantages of the present invention will become better understood with regard to the following description, appended claims and accompanying figures where:

FIG. 1 is an isometric view of a typical pair of glasses with lenses having features of the invention;

FIG. 2 is a cross-sectional view of a lens having features of the invention;

FIG. 3 is a cross-sectional view of the lens illustrated in FIG. 2;

FIG. 7 is a front view of an uncut lens having features of the invention;

FIGS. 8A, 8B, 8C and 8D are front views of differing pairs of glasses having lenses with differing central portion shapes;

DETAILED DESCRIPTION

Figure 4:
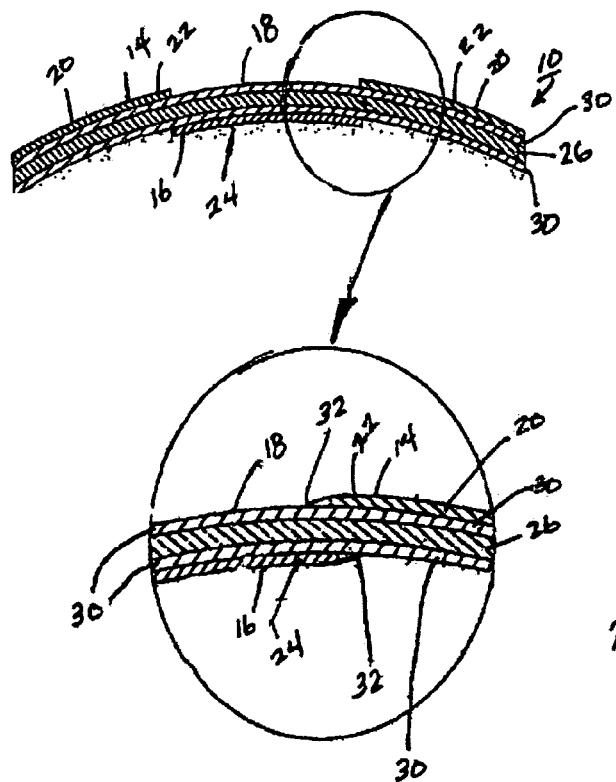
FIG. 4 is an enlarged detail view of the lens illustrated in FIG. 2.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a lens 10 for eyeglasses 12 comprising a front side 14, a back side 16, a central portion 18 and a peripheral portion 20. The lens 10 is coated on one or both of its sides with a reflective coating 22, an anti-reflective coating 24 or both. The reflective coating 22 and/or anti-reflective coating 24 in the central portion 18 are different than the reflective coating 22 and/or anti-reflective coating 24 in the peripheral portion 20. By "different," it is meant that either the composition of the coatings 22 and/or 24 are different, the thicknesses of the coatings 22 and/or 24 are different or the relative reflecting or anti-reflecting powers of the coatings 22 and/or 24 layers are different.

FIG. 1 illustrates a typical pair of eyeglasses 12 incorporating a pair of lenses 10 having features of the present invention. The eyeglasses 12 are disposed within a conventional eyeglass frame 26. The frame 26 can be made of metal, plastic or any other conventional materials used for making eyeglass frames. The lenses 10 are made from conventional optical substrates 28, such as optical glass or optical plastics. The lenses 10 can be non-prescription, prescriptive for farsightedness or prescriptive for nearsightedness. The lenses 10 can also be tinted or clear.

The central portion 18 is substantially aligned with the eye 27 of the user. The precise location of the central portion 18 is typically determined by the size of the lens 10, the size of the frame 26 and the distance between the two eyes of the user. For men, the distance between the physical center of the central portion 18 is typically between about 58 mm and 69 mm. For women, the distance is typically between about 55 mm and 65 mm. The size of the central portion 18 is most often about the size of a human eyeball, but the size of the central portion 18 also depends on the size of the lens 10. The relatively small size of the central portion 18 is used for a smaller size lens 10.

In the embodiment illustrated in FIG. 1, the peripheral portion 20 completely surrounds the central portion 18. This is not necessary, however, as will be further discussed below.

FIG. 2 illustrates a cross-section of one embodiment of the lens 10 of the present invention. The front 14 of the lens 10 is the side that is closest to objects being viewed. The back side 16 of the lens 10 is the side that is closest to the eye 27 of the user. The lens 10 in FIG. 2 comprises a substrate 28, a pair of hard coatings 30, a reflective coating 22 and an anti-reflective coating 24. As alluded to above, the substrate 28 can be made of glass or plastics, such as PMMA or any other optical plastics or any other optical materials commonly known in the industry.

The hard coatings 30 are applied directly to both sides of the substrate 28. The hard coatings 30 are not essential to the present invention. However, they are preferred if the substrate 28 is made of an organic material. The main function of the hard coating 30 is to protect the substrate 28 from scratching.

In the embodiment illustrated in FIG. 2, the reflective coating 22 is disposed on the front side 14 of the lens 10. The reflective coating 22 acts as a mirror to reflect most of the light directed at the lens 10. The reflective coating 22 typically comprises several layers of reflecting coating components. The reflective coating 22 can comprise any one of the many reflective coating components known in the industry. The reflective coating 22 typically comprises a layer containing silver dioxide or other similar material, either alone or combined with such materials as chromium, silicon monoxide, silicon dioxide, titanium dioxide and zirconium dioxide. The reflective coating 22 can also comprise an ultraviolet blocking layer and/or a waterproofing layer.

In the embodiment illustrated in FIG. 2, the anti-reflective coating 24 is disposed on the back side 16 of the lens 10. The anti-reflective coating 24 minimizes the reflection of glare from the back side 16 of the lens 10, thereby reducing eye fatigue. The anti-reflective coating 24 typically comprises magnesium hexafluoride or other anti-reflective materials known in the industry. The anti-reflective coating 24 may also include materials such as silicon dioxide, titanium dioxide and zirconium dioxide. Like the reflective coating 22, the anti-reflective coating 24 can also be a single or a multiple layer coating.

In the embodiment illustrated in FIG. 2, the reflective coating 22 is only applied to the peripheral portion 20 of the front side 14 of the lens 10. Conversely, the anti-reflective coating 24 is only applied to the central portion 18 of the back side 16 of the lens 10.

FIG. 3 illustrates the advantages of the lens 10 illustrated in FIG. 2. In FIG. 3, the letters "A," "B" and "C" represent light sources. The light sources A and C represent stray light. The light source B represents direct light. The light source B is the light source that the eye 27 is focused on. When the light source B passes through the lens 10, it is not reflected by a reflective coating 22 since the central portion 18 of the front side 14 of the lens 10 does not have any reflective coating 22. Therefore, the eye 27, when it is focused on the intended viewing object—the light source B in this instance, can view the object in its full light intensity. The stray light source A provides light which distracts the eye 27 in focusing on the light source B. The light source A is an undesirable light source. Reducing or minimizing the stray light source A helps the eye 27 to focus on the viewing object and ease eye fatigue. Since the light from the light source A is reflected by the reflective coating 22, the remaining light going through the lens 10 is significantly reduced.

The anti-reflective coating 24 on the central portion 14 of the back side 20 of the lens 10 enhances the light transmission from the light source B. Since the anti-reflective coating 24 also absorbs stray light (the light source C in FIG. 3) from the back of the viewing eye 27, it further reduces eye fatigue.

An additional advantage of the lens 10 illustrated in FIG. 2 arises from the minimum use of anti-reflective coatings 24. Because most materials used in anti-reflective coatings 24 attract dirt and fingerprints, the minimum non-use of anti-reflective coatings 24 on the peripheral portion 16 of the lens 10 minimizes the need for frequent cleaning of the lens 10.

In the manufacture of the lens 10, the thickness of the coatings 22 and 24 on both the front and back sides 14 and 16 of the lens 10 typically varies near the edges 32 of each coating 22 or 24. FIG. 4 is an enlarged cross-section of a lens 10 such as illustrated in FIGS. 2 and 3. FIG. 4 illustrates a typical unevenness of the reflective and anti-reflective coatings 22 or 24 at the edges 32 of the coatings 22 and 24. As illustrated in FIG. 4, the thickness of the reflective coating 22 at its edge 32 is thinner than its thickness away from its edge 32. Similarly, the thickness of the anti-reflective coating 24 at its edge 32 is thinner than its thickness away from its edge 32.

Figure 5:
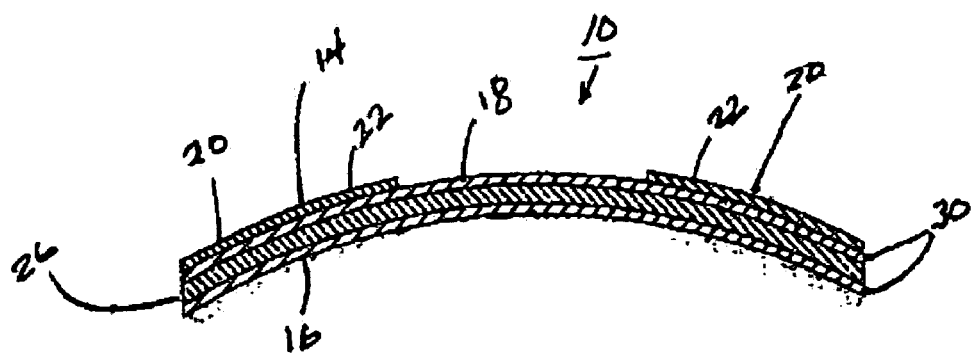
FIG. 5 is a cross-sectional view of a second lens having features of the invention.

FIG. 5 illustrates another embodiment of the invention. The lens 10 in FIG. 5 is similar to the lens 10 illustrated in FIG. 2. The only difference is that the lens 10 in FIG. 5 does not have an anti-reflective coating 24.

Figure 6:
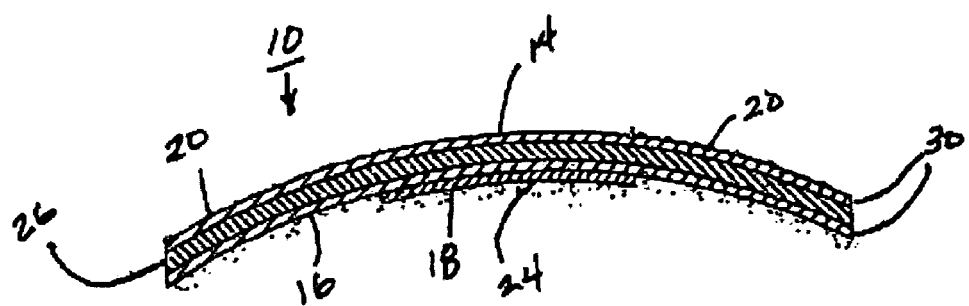
FIG. 6 is a cross-sectional view of a third lens having features of the invention.

FIG. 6 illustrates yet another embodiment of the invention. The lens 10 in FIG. 6 is also similar to the lens 10 described in FIG. 2. The only difference is that the lens 10 in FIG. 6 does not have a reflective coating 22.

Referring now to FIG. 7, an uncut lens 34 is shown in a large circular shape. The area inside the perforated line is that portion of the uncut lens 34 which will become a lens 10 similar to the lens 10 shown in FIG. 1. The uncut lens 34 is cut along the perforated line 35 to form the lens 10. The lens 10 can be cut into different shapes. The central portion 18 is usually created before the lens 10 is cut out of the uncut lens 34. The central portion 18 is defined when the reflective and/or anti-reflective coatings 22 and/or 24 are applied to each side of the lens 10.

FIGS. 8A, 8B, 8C and 8D shows different embodiments of the invention having different shapes of a central portion 18. As shown in FIGS. 8A, 8B, 8C and 8D, the shapes of the central portions 18 can be triangle-shaped, square-shaped, oval-shaped, lightbulb-shaped, etc. The combinations of the frame shapes and the central portion shapes shown in FIGS. 8A, 8B, 8C and 8D are not essential for this invention. Different central portion shapes can be combined with any frame shapes.

Figure 9:
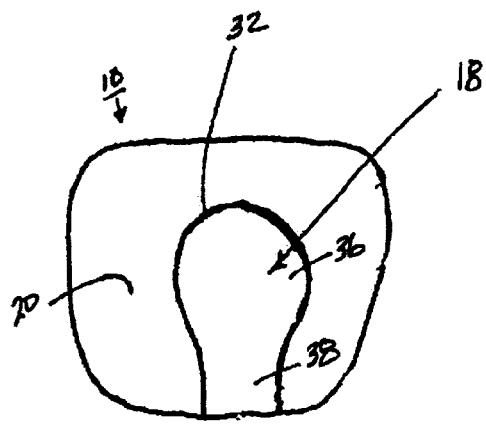
FIG. 9 is a lens having features of the invention with a lightbulb-shaped central portion.
Figure 10:
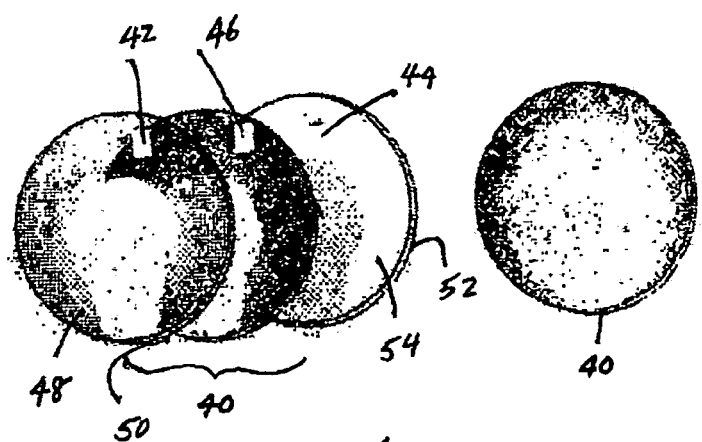
FIG. 10 is an illustration of a tinted lens with a color film having features of the invention.

FIG. 9 shows the present invention as a lens 10 with a lightbulb-shaped central portion 18. The lightbulb-shaped central portion 18 is formed with a generally circular portion 36 and an elongated portion 38 which extends downwardly from the circular portion 36. The circular portion 36 is disposed at a location similar to the location of the central portion 18 in the lens 10 illustrated in FIG. 2. In the embodiment illustrated in FIG. 9, the central portion 18 is not completely surrounded by the peripheral portion 20. Eyeglasses 12 using this particular embodiment enhance the ability of the user to view closer objects by looking downwardly without moving his or her head.

The lenses 10 described in all the embodiments of the invention can be tinted with colors known in the industry. They can be tinted by different tinting processes known to the industry. The tinted lens 10 can be unevenly tinted. An unevenly tinted lens 10 has a lighter tint at the central portion 18 of the lens 10 than the tint at the peripheral portion 20 of the lens 10 with the darkest tint at the edge of the lens 10 and gradually lightened toward the central portion 18 of the lens 10. In some embodiments, the center of the central portion 18 has no tint at all. At the edge 32 where the central portion 18 and the peripheral portion 20 meet, the tint color is gradually lightened toward the central portion 18.

The lenses described in all the embodiments of the invention can also be tinted with lamination tint materials. FIG. 8 illustrates the lamination of a tinted lens. An entire lens 40 is laminated by a top crystal 42, a bottom crystal 44 and a color film 46. The top crystal 42 has a top outer-side 48 and a top inner-side 50. The bottom crystal 44 has a bottom outer-side 52 and a bottom inner-side 54. The color film 46 is laminated between the top inner-side 50 and the bottom inner-side 54. The top crystal 42 and the bottom crystal 44 are made from conventional optical glass, optical plastics or any optical materials that can be used for optical lenses. The color film 46 is made from any transparent film tinted with color. Another tinting process is to print color on either the top inner-side 50 or the bottom inner-side 54. After the color is printed on either or both inner-sides of the crystals, the top and bottom crystals are laminated to form a tinted lens 40. The process of printing color on the inner-sides of the crystal can also be done by depositing color, dyeing color, spraying color, etc. on either or both inner-sides of the crystals.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A lens for eyeglasses comprising a front side, a back side, a central portion and a peripheral portion, the lens being coated on one or both of its sides with a reflective coating, an anti-reflective coating or both, the reflective and/or anti-reflective coatings in the central portion being different than the reflective and/or anti-reflective coatings in the peripheral portion, wherein the central portion is light bulb-shaped.

2. A lens for eyeglasses comprising a front side, a back side, a central portion and a peripheral portion, the lens being coated on the peripheral portion of the front side of the lens with a reflective coating and the lens being coated on the central portion of the back side of the lens with an anti-reflective coating, the central portion of the front side of the lens and the peripheral portion of the back side of the lens being coated with neither a reflective coating or an anti-reflective coating, wherein the central portion is light bulb-shaped.

3. A lens for eyeglasses comprising a front side, a back side, a central portion and a peripheral portion, the lens being coated on the peripheral portion of the front side of the lens with a reflective coating but not on the central portion of the front side of the lens, the central portion being light bulb-shaped.

4. The lens of claim 3 wherein an anti-reflective coating is applied to the central portion of the back side of the lens.

5. The lens of claim 4 wherein the anti-reflective coating comprises at least one material selected from the group consisting of magnesium hexafluoride, silicon dioxide, titanium dioxide and zirconium dioxide.

6. The lens of claim 3 wherein the back side of the lens has no anti-reflective coating.

7. The lens of claim 3 wherein the reflective coating comprises at least one material selected from the group consisting of silver dioxide, chromium, silicon monoxide, silicon dioxide, titanium dioxide and zirconium dioxide.

8. The lens of claim 3 wherein the lens has a color film laminated in the lens.

9. An eyeglass lens comprising a front side, a back side, a central portion and a peripheral portion, the lens being coated on the peripheral portion of the front side of the lens with a reflective coating and the lens being coated on the central portion of the back side of the lens with an anti-reflective coating, the central portion of the front side of the lens and the peripheral portion of the back side of the lens being coated with neither a reflective coating or an anti-reflective coating, wherein the central portion and peripheral portion of the lens are nonmovable and the eyeglass lens is used without contacting any portion of an eyeball.

10. The lens of claim 9 wherein the reflective coating comprises at least one material selected from a group consisting of silver dioxide, chromium, silicon monoxide, silicon dioxide, titanium dioxide and zirconium dioxide.

11. The lens of claim 9 wherein the anti-reflective coating comprises at least one material selected from the group consisting of magnesium hexafluoride, silicon dioxide, titanium dioxide and zirconium dioxide.

12. The lens for claim 9 wherein the central portion is light bulb-shaped.

13. The lens of claim 9 wherein the lens has a color film laminated in the lens.

14. An eyeglass lens comprising:
a front side having a front central portion and a front peripheral portion;
a back side having a back central portion and a back peripheral portion;
the front peripheral portion having a reflective coating;
the front central portion having no reflective coating;
the back central portion having an anti-reflective coating; and
the back peripheral portion having no anti-reflective coating.

15. An eyeglass lens and frame combination comprising:
an eyeglass lens as in claim 14; and
an eyeglass frame for use by a user, the eyeglass lens disposed in the frame such that the user's eye sees substantially through the central portions of the lens when the user wears the eyeglass frame and the user is looking forward.

16. An eyeglass lens and frame combination comprising:
a first eyeglass lens as in claim 14;
a second eyeglass lens as in claim 14; and
an eyeglass frame for use by a user, the first and second eyeglass lenses disposed in the frame such that the user's eyes see substantially through the central portions of the lenses when the user wears the eyeglass frame and the user is looking forward, wherein the distance between the central portions of the first and second eyeglass lenses is between about 55 mm and 69 mm.

17. The eyeglass lens of claim 14, wherein the front central portion is about the size of a human eyeball and the back central portion is about the size of a human eyeball.

18. The eyeglass lens of claim 14, wherein the reflective coating on the front peripheral portion is thinner near the front central portion than away from the front central portion, and the anti-reflective coating on the back central portion is thinner near the back peripheral portion than away from the back peripheral portion.

19. An eyeglass lens comprising:
a substrate made of optical material having a front side and a back side;
a front coating disposed upon the front side of the substrate, the front coating having a front central portion with a reflective coating and a front peripheral portion with no reflective coating; and
a back coating disposed upon the back side of the substrate, the back coating having a back central portion with an anti-reflective coating and a back peripheral portion with no anti-reflective coating;
wherein the front coating and back coating protect the substrate from scratching.

20. The eyeglass lens of claim 19, wherein the reflective coating on the front peripheral portion is thinner near the front central portion than away from the front central portion, and the anti-reflective coating on the back central portion is thinner near the back peripheral portion than away from the back peripheral portion.

21. A method of making an eyeglass lens comprising:
providing a substrate having a front side and a back side;

disposing a front coating upon the front side of the substrate so as to protect the substrate from scratching, the front coating having a front central portion and a front peripheral portion;

disposing a back coating upon the back side of the substrate so as to protect the substrate from scratching, the back coating having a back central portion and a back peripheral portion;

disposing a reflective coating upon only the front peripheral portion of the front coating; and disposing an anti-reflective coating upon only the back central portion of the back coating.

22. The method of claim 21, wherein the reflective coating on the front peripheral portion is disposed so as to be thinner near the front central portion than away from the front central portion, and the anti-reflective coating on the back central portion is disposed so as to be thinner near the back peripheral portion than away from the back peripheral portion.

* * * * *